(12) United States Patent
Ratnakar

(10) Patent No.: US 6,556,688 B1
(45) Date of Patent: Apr. 29, 2003

(54) WATERMARKING WITH RANDOM ZERO-MEAN PATCHES FOR PRINTER TRACKING

(75) Inventor: Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/268,766

(22) Filed: Mar. 15, 1999

(51) Int. Cl.$^7$ .................................................. G06K 9/00
(52) U.S. Cl. ........................ 382/100; 713/176; 713/179
(58) Field of Search ........................... 380/51, 54, 210, 380/252, 287; 382/100, 232, 240; 370/527, 529; 348/460, 461, 463; 713/176, 179

(56) References Cited

U.S. PATENT DOCUMENTS

| | | | |
|---|---|---|---|
| 5,418,602 A | 5/1995 | Nishikawa | |
| 5,530,759 A | 6/1996 | Braudaway et al. | |
| 5,606,609 A | 2/1997 | Houser et al. | |
| 5,617,119 A | 4/1997 | Briggs et al. | |
| 5,621,503 A | 4/1997 | Komaki et al. | |
| 5,664,018 A | 9/1997 | Leighton | |
| 5,734,752 A | 3/1998 | Knox | |
| 5,742,408 A | 4/1998 | Funada et al. | |
| 5,745,604 A | 4/1998 | Rhoads | |
| 5,790,703 A | 8/1998 | Wang | |
| 5,819,289 A | 10/1998 | Sanford, II et al. | |
| 5,822,432 A | 10/1998 | Moskowitz et al. | |
| 5,822,660 A | 10/1998 | Wen | |
| 5,825,892 A | 10/1998 | Braudaway et al. | |
| 5,832,186 A | 11/1998 | Kawana | |
| 5,875,249 A | * 2/1999 | Mintzer et al. | ................ 380/54 |
| 5,930,369 A | * 7/1999 | Cox et al. | ..................... 380/54 |
| 6,154,571 A | * 11/2000 | Cox et al. | ................... 382/250 |

OTHER PUBLICATIONS

Petitcolas, et al., "*Attacks on Copyright Marking Systems*", Second Workshop on Information Hiding, vol. 1525 of Lecture Notes In Computer Science, Apr. 1998, pp. 218–238.

A.W. Paeth, "*A Fast Algorithm For General Raster Rotation*", Graphics Gems, A.S. Glassner, ed., 1990, pp. 179–195.

Ingemar J. Cox, et al., "*A Secure, Robust Watermark for Multimedia*", Workshop on Information Hiding, Newton Institute, Univ. of Cambridge, May 1996, pp. 1–16.

Joseph J.K. O'Ruanaidh, et al. "*Rotation, Scale and Translation Invariant Digital Image Watermarking*" (4 pages).

I. Pitas, "*A Method For Signature Casting On Digital Images*", IEEE, 1996, pp. 215–218.

* cited by examiner

Primary Examiner—Bhavesh Mehta
Assistant Examiner—Abolfazl Tabatabai
(74) Attorney, Agent, or Firm—Michael T. Gabrik

(57) ABSTRACT

A steganographic method embeds hidden information like digital watermarks and digital fingerprints into an image by applying one or more zero-mean patches to a digital signal that conveys the image. Each zero-mean patch comprises elements having an average value substantially equal to zero. A printer tracking system is implemented by selecting a plurality of zero-mean patches according to a string of bits representing a printer serial number, and modifying printer control signals to embed the plurality of patches in each of a number of virtual cells within the image to be printed. The offset of the virtual cells with respect to the boundaries of the image and the location of the patches within each virtual cell are established in pseudo-random fashion. The printer tracking system further includes a technique for subsequently detecting the printer serial number by scanning the printed image and running a detection algorithm on the scanned data to recover the string of bits embedded in the zero-mean patches.

38 Claims, 9 Drawing Sheets

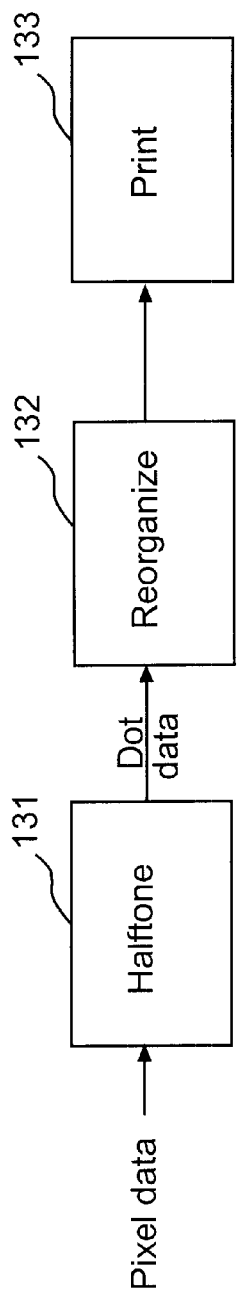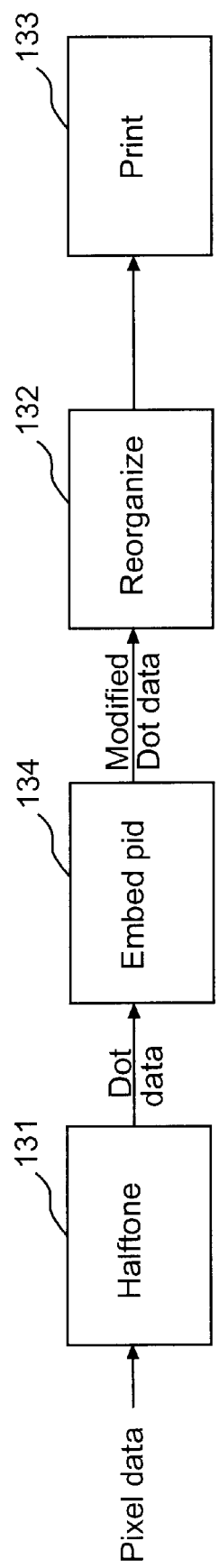

WATERMARKING WITH RANDOM ZERO-MEAN PATCHES FOR PRINTER TRACKING

TECHNICAL FIELD

The present invention pertains generally to digital image processing and relates more particularly to image processing that embeds inconspicuous identifying or authenticating information known as watermarks into an image and that detects the embedded information. The present invention for embedding information in an image and for detecting the embedded information may be incorporated into systems and methods that can be used to identify the printer used to generate a printed rendition of the image.

BACKGROUND ART

The proliferation of computers with increasing computational power has contributed to the growth of digital image processing. Digital images are attractive because they can be copied without concern for image degradation, and because they can be easily modified, enhanced and adapted to provide high-quality images that meet a wide range of application requirements. These characteristics of digital images are also sources of concern for owners of images that wish to protect copyrights in the images or that wish to detect and identify sources of unauthorized copying.

In response to these concerns, there have been attempts to develop ways to embed information into other information or "cover objects" such as images that can identify the owner of the cover object or that can identify the device that was used to produce an unauthorized copy. In particular, there has been considerable effort to develop ways to hide authenticating information in images to enable subsequent proof of ownership. The other important application of embedding information in images is to enable source tracking for images produced on permanent media such as paper. This invention primarily relates to the latter application.

On the one hand, the identifying information should be inconspicuous in the sense that it does not visibly alter the image and yet is detectable using appropriate recovery techniques. The information needs to be detectably embedded regardless of image kind such as text or natural or graphics. Moreover, the detection needs to succeed even if only a small area of the printed image is available, and even if the image area has been degraded by repeated handling and wear and tear. Unfortunately, this reliability goal conflicts with the goal of inconspicuous embedding.

Two basic types of information hiding techniques have been developed to embed information that is robust and resistant to various types of printed image wear and tear. One type of technique embeds the information in a spatial or pixel domain. The second type of technique embeds the information in a spectral of frequency domain.

What is needed is an information hiding technique that can embed inconspicuous identifying information into a printed image in a manner that persists through ordinary or extraordinary modifications to the printed image, such as normal wear and tear, and deliberate attempts to tamper with the printed image.

DISCLOSURE OF INVENTION

It is therefore an object of the present invention to provide for efficient embedding of information into a cover object such as a printed image that is inconspicuous yet resistant to removal or alternation by a wide range of modifications to the printed image, and for the efficient detection of the embedded information.

According to one aspect of the present invention, a source-identifying watermark is applied to a digital signal by: obtaining a source identifier; constructing a multi-bit string, which includes the source identifier, representing the watermark to be embedded; randomly selecting a sequence of zero-mean patches, one for each bit of the watermark to be embedded, each patch comprising an array of patch elements, and respective offsets for these patches within a selected tile of the digital signal in which the watermark is to be embedded; and applying each zero-mean patch of the sequence to a randomly selected location within the selected tile of the digital signal so that, at the selected patch location, the digital signal has either a highly positive or highly negative correlation with the corresponding selected patch.

According to another aspect of the invention, a watermark is read from a cover object by: obtaining a first digital signal from the cover object; selecting a portion of the first digital signal from a search space to be examined to determine if the watermark is present in the cover object; obtaining a multi-bit string representing the watermark to be read; obtaining zero-mean patch kinds that were previously applied to a second digital signal of the cover object and the corresponding locations in that signal where the patches were applied; correlating the first digital signal with the appropriate zero-mean patch kind for a corresponding bit of the watermark over a plurality of tile locations in the first digital signal to obtain a sequence of bits; and comparing the sequence of bits obtained in the correlating step with corresponding bits of the multi-bit string to determine whether the watermark has been detected.

The watermark applying technique may be implemented in a printer by applying the watermark to a digital signal, such as digital image data representing the image to be printed, after the halftoning process but before printing. The watermark reading technique may be implemented in a computer system. Either technique may be embodied in a program of instructions for execution by the printer or computer.

Throughout the disclosure of the present invention, more particular mention is made of cover objects that are images conveyed by digital signals. It is anticipated that the present invention may have greater advantages in identifying an imaging device such as a printer which generates a printed rendition of the cover object; however, the principles of the present invention are not so limited and can be applied to other image processing applications and to a wide range of cover objects including text and audio.

As mentioned above, the present invention is carried out by processing signals with zero-mean patches. The term "patch" refers to a set of discrete elements that are arranged to suit the needs of each application in which the present invention is used. In image processing applications, the elements of a single patch are arranged to coincide with digital image "pixels" or picture elements. Patch elements may be arranged in essentially any pattern. Throughout the following disclosure, embodiments are discussed in which patch elements are arranged within a square area; however, no particular arrangement of patch elements is critical to the practice of the present invention.

The term "zero-mean patch" refers to a patch that comprises elements having values the average of which is substantially equal to zero. An average value is substantially equal to zero if it is either exactly equal to zero or differs from zero by an amount that is arithmetically insignificant to the application in which the zero-mean patch is used. A wide variety of zero-mean patches are possible but only a few basic patches with unit magnitude elements are disclosed herein.

The present invention relies on the fact that for a digital signal conveying essentially any meaningful image (which would include natural images as well as synthetic graphics) zero is the expected value of the correlation score for a large number of small zero-mean patches that are located at random locations within the digital signal. The correlation score may be expected to equal zero because, over small regions of a meaningful image, digital signal intensities vary slowly almost everywhere in the image. Signal element or "pixel" intensities vary much more quickly at edges appearing in the image; however, for a large number of random locations, the edge contributions to the correlation score can be expected to substantially cancel one another.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIG. 4A illustrates some typical processing steps in printing an image.

FIG. 4B illustrates printing processing steps of FIG. 4A as modified in accordance with the present invention.

MODES FOR CARRYING OUT THE INVENTION

A. Overview of Signal Processing Method

Figure 1:
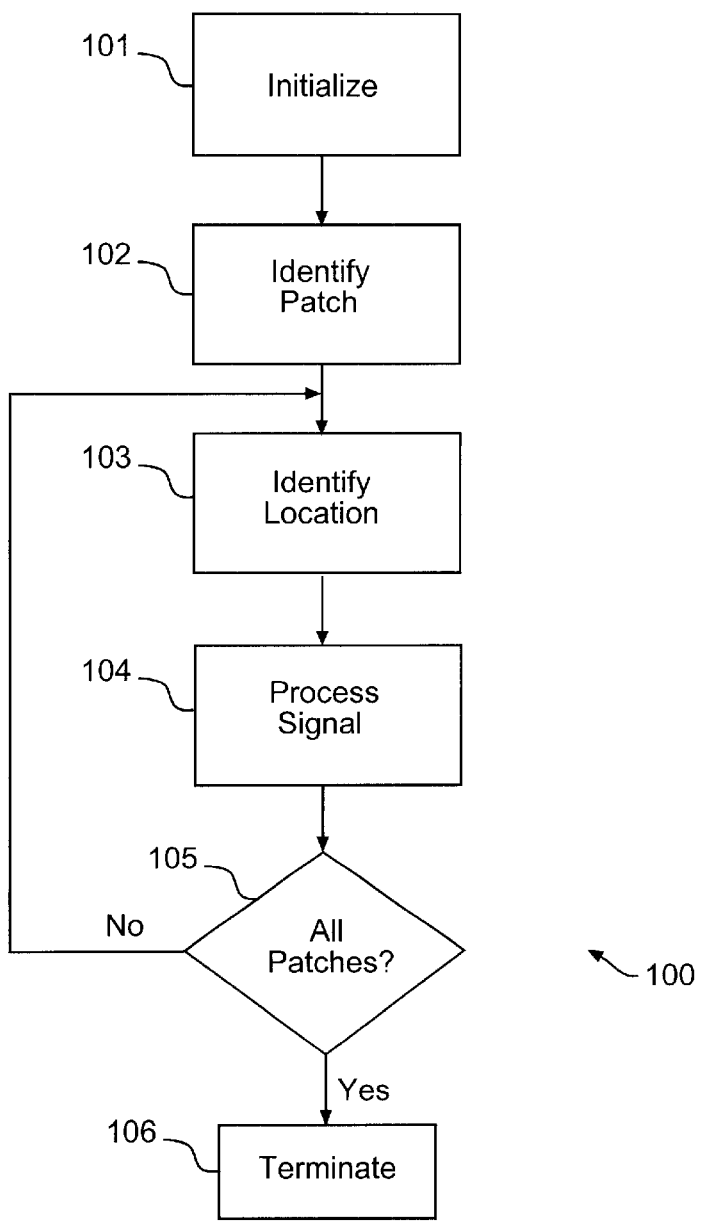
FIG. 1 illustrates steps in a method for embedding information into a cover object and for detecting such embedded information.

The diagram shown in FIG. 1 illustrates steps in method 100 for embedding information such as a watermark or a fingerprint into a cover object such as a digital signal conveying an image and for detecting such embedded information. The term "watermark" sometimes refers to embedded information that indicates ownership of the associated cover object. As such, the presence or absence of the watermark can indicate whether an entity is the owner of a cover object. The term "fingerprint" sometimes refers to embedded information that identifies the origin of a particular copy of a cover object. For example, a fingerprint can convey the serial number of the printer that was used to produce a printed copy of the cover object. In this disclosure, the term "watermark" is used as a generic reference to essentially any type of embedded information.

Step 101 performs initialization activities such as initializing a random number generator or initializing information used to control the execution of subsequent steps. A sequence of pseudo-random numbers obtained from a so called random number generator may be used to enhance the resistance of embedded information to unauthorized removal. Preferably, the random number generator is cryptographically strong in the sense that the particular sequence of numbers obtained from the generator varies in response to a "seed" or initialization value, no output of the generator can be predicted without knowing the seed, and it is infeasible to determine the seed that will make the generator produce any particular sequence of numbers. Although the sequence of numbers obtained from a random number generator are not truly random, such sequences are referred to herein as random for simplicity.

Step 102 identifies and selects a patch from a plurality of zero-mean patches. In preferred embodiments, the patch selection is random according to a sequence of random numbers. If desired, the elements of a selected patch may be modified or perturbed in some random fashion. Furthermore, the size of the patch may be chosen at random from a range of sizes.

Schematic representations of four basic zero-mean patches are illustrated in FIGS. 2A through 2D. Four additional patches may be formed by reversing the shaded and unshaded areas. The shaded area in each patch represents patch elements having a value of −1. The unshaded area in each patch represents patch elements having a value of +1. As illustrated, the boundary between areas is represented as a straight line; however, the boundary in an actual patch is chosen so that exactly half of the patch elements have a value equal to +1 and the remaining half of the elements have a value of −1. If a patch has an odd number of elements, the center element is given a value of zero. Each element of a selected patch can be scaled by a fixed amount or by a random value.

Figure 3:
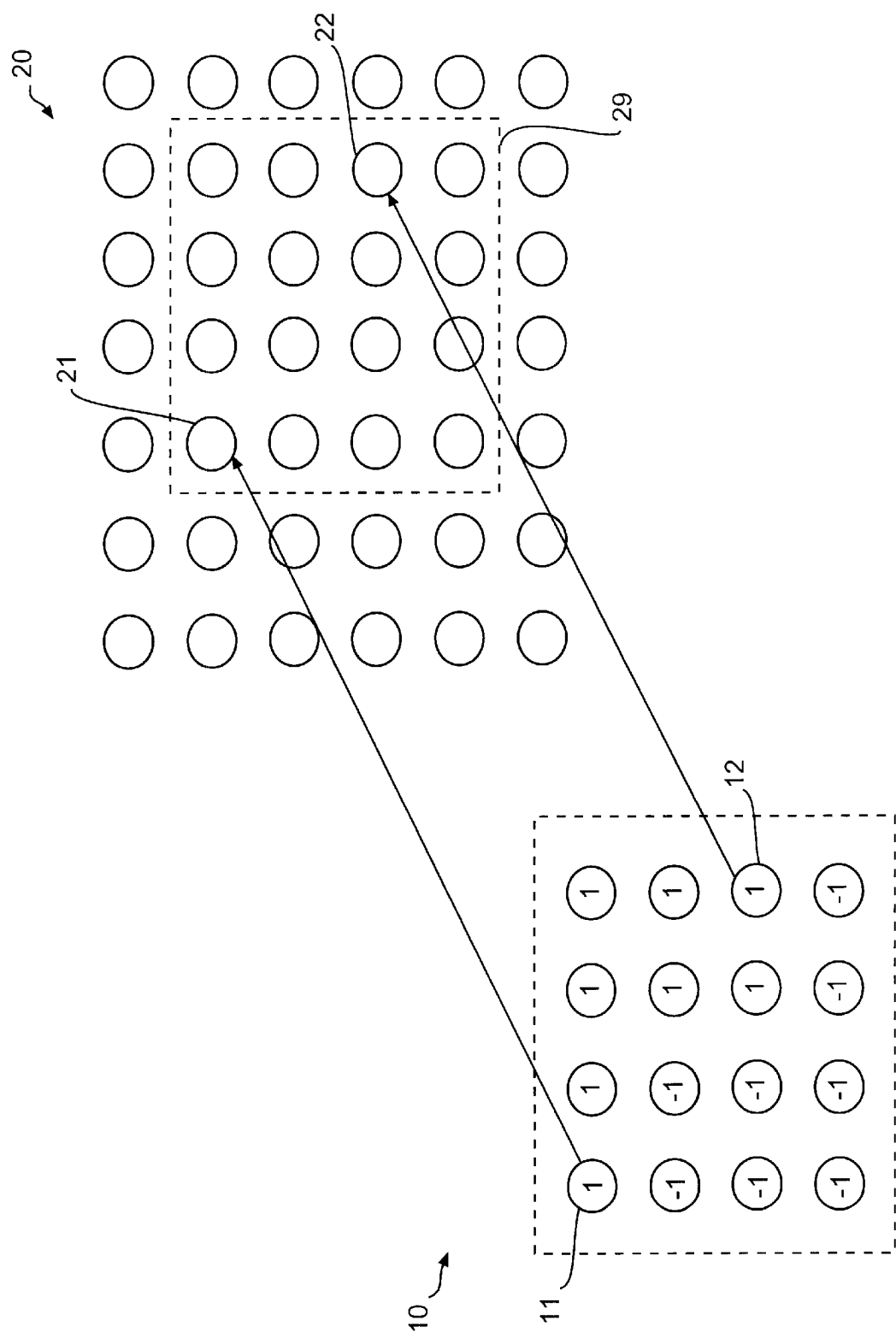
FIG. 3 illustrates a zero-mean patch that is aligned with a digital signal.

One element of each zero-mean patch is designated an "anchor patch element" and is used to align the patch with an "anchor signal element" at a specified location in the cover object. For ease of discussion and illustration, the following disclosure and the accompanying figures assume each patch comprises a square array of unitary magnitude elements in which the anchor patch element is in the upper left corner. Referring to FIG. 3, patch 10 corresponds to the basic patch shown in FIG. 2C that comprises a 4×4 array of patch elements in which element 11 is the anchor patch element. As shown in FIG. 3, anchor patch element 10 is aligned with anchor signal element 21 in digital signal 20, and patch element 12 corresponds to signal element 22. Broken line 29 illustrates the outline of patch 10 when it is aligned in this manner.

Referring again to FIG. 1, step 103 identifies an anchor signal element that corresponds to a selected location within the cover object. Preferably, the location within the cover object is selected in a random fashion.

Step 104 aligns the anchor element of the selected patch with the anchor signal element and processes the elements of the selected patch with respective elements of the cover object to either apply a patch or to check for the presence of a patch. Ways in which this processing may be carried out are discussed below.

If the cover object is processed for more than one patch, step 105 determines if all processing has been completed. If not, steps 102 through 104 continue by selecting another patch and processing the cover object at another location. When the processing for all patches has been completed, step 106 terminates the method.

According to the present invention, information may be embedded into a cover object by applying one or more zero-mean patches to the digital signal conveying the cover object. This may be accomplished to track the device from which the cover object was printed. The following sections explain such an approach.

B. Printer Tracking System

The principles and methods for embedding information in a cover object and for detecting embedded information may be incorporated into systems and methods that can be used to identify the printer used to generate a printed rendition of an image. In this context, the term "printer" refers to essentially any type of device or system capable of generating a pixelized or a halftone rendition of an image on an opaque medium like paper or a translucent medium like acetate in response to information conveyed by a digital signal. Examples include ink-jet, laser and dot-matrix printers commonly used with general-purpose computers, digital copiers and half-tone printers.

In the following discussion, it is assumed that a printer is assigned a unique identifier pid such as a concatenation of binary strings representing the printer manufacturer, model and serial number. The pid may additionally include information such as date, time and GPS location. The intent of the printer tracking system discussed below is to use watermarks to embed the bits of the printer identifier pid in an image as the image is printed, and to subsequently detect the printer identifier by first scanning the printed image and then running a detection algorithm on the scanned data. The technique is particularly advantageous to documents conveying natural images but is applicable to other types of documents and is applicable to all areas of a compound document, including white, graphics and text.

The printer tracking system utilizes the fact that correlation of a zero-mean patch with a meaningful image at a random location will have zero expected value. The pid is embedded by forcing the correlation to be high at certain predetermined, randomly scattered locations within an image. For each bit to be embedded, a zero-mean patch (or several zero-mean patches, in alternate embodiments) is randomly selected along with several randomly selected image locations. If the bit is 1, then the correlation of the image with the selected patch(es) at the selected locations is forced to be highly positive. If the bit is 0, then the correlation of the image with the selected patch(es) at the selected locations is forced to be highly negative.

In the printing process, a digital image undergoes several processing steps such as scaling and halftoning, to be made suitable for printing. The end of a typical printing pipeline is shown in FIG. 4A. The halftone module 131 converts the incoming pixel data to dot data, which consists of an array of dots of possibly several colors, with each dot either being 1 (ON) or 0 (OFF) (there might be a small number of levels of ON, but for ease of discussion, the invention will be described using binary ON/OFF pixels). The dot data for each color consists of an array of dots meant to be printed at $d_x$ dots per inch (dpi) horizontally and $d_y$ dpi vertically. The dot data is then possibly reorganized in module 132 (such as a microweaving module) and then printed (133) on the desired media. The data may flow through the pipeline on a line-by-line or block-by-block or page-by-page basis.

A printer tracking system has to make tiny modifications to the image data to embed the pid such that it can be subsequently detected. The modifications need to be tiny enough so that the visual quality of the printed image is not diminished at all. Such tiny modifications, if made in the pixel domain, cannot reliably survive the halftoning process. Hence, the printer tracking system makes modifications to the image data in the dot domain, as indicated in FIG. 4B. As shown in FIG. 4B, the pid is preferably embedded in module 134 after halftoning 131 but before reorganization 132.

The printer tracking system uses a predetermined physical resolution d dpi (both horizontally and vertically) at which the watermark is embedded. In one embodiment described below, d=360 dpi. Given a printed image whose printer's pid is to be determined, the image is scanned at d dpi, and then the scanned pixel data is used by the detection algorithm. To achieve this detection functionality, watermark embedding is done on the incoming $d_x \times d_y$ resolution dot data to produce $d_x \times d_y$ resolution modified dot data which, subsequent to printing at $d_x \times d_y$ resolution and then scanning at d dpi, would allow the embedded pid to be reliably detected. An abstract frame of reference of "elements" arranged at d dpi to describe the watermarking process is used. An X×Y area of elements consists of an $(Xd_x/d) \times (Yd_y/d)$ area of dots.

1. Writing a Watermark a. General Description

Figure 5:
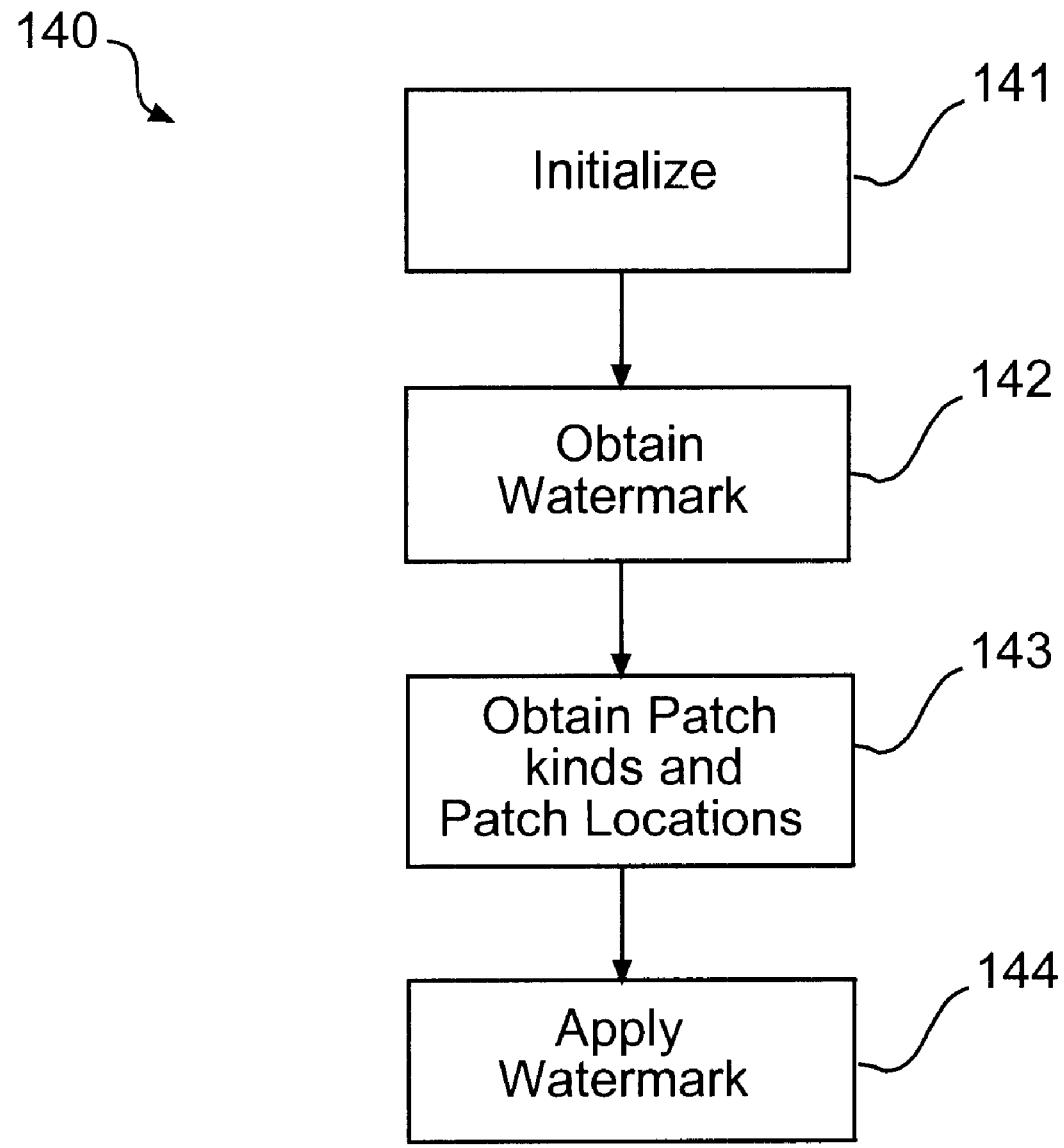
FIG. 5 illustrates steps in a method for applying a watermark to a document for purposes of printer tracking.

The diagram in FIG. 5 illustrates steps in method 140 for applying a watermark to a document for purposes of printer tracking. Step 141 performs initialization for the following steps, which includes initializing a random number generator and obtaining the printer identifier pid. Step 142 constructs a binary string representing the watermark to be embedded. The watermark comprises the printer identifier pid, a synchronization string referred to herein as a "magic string" mst, and an error-detection-correction code ecc. In one embodiment that is discussed below, pid is 48 bits in length, mst is 43 bits in length, and ecc is 164 bits in length, for a total watermark length of 255 bits.

Step 143 uses the random number generator to randomly select a sequence of zero-mean patches and respective offsets for these patches within a prototypical "tile" or region of the image in which the watermark is to be embedded. The offsets, patch dimensions, and tile dimensions are all specified at d elements per inch. In the embodiment discussed below, one patch is selected for each bit of the watermark to embed. Each patch is a B×B array of elements selected from a fixed set of N zero-mean patches. In one implementation, B is 4 and N is 8. In another implementation, used by the inventor, N is 2. FIGS. 2A to 2D show four examples of zero-mean patches. Another four examples would be the inverses of these patches.

Figure 6:
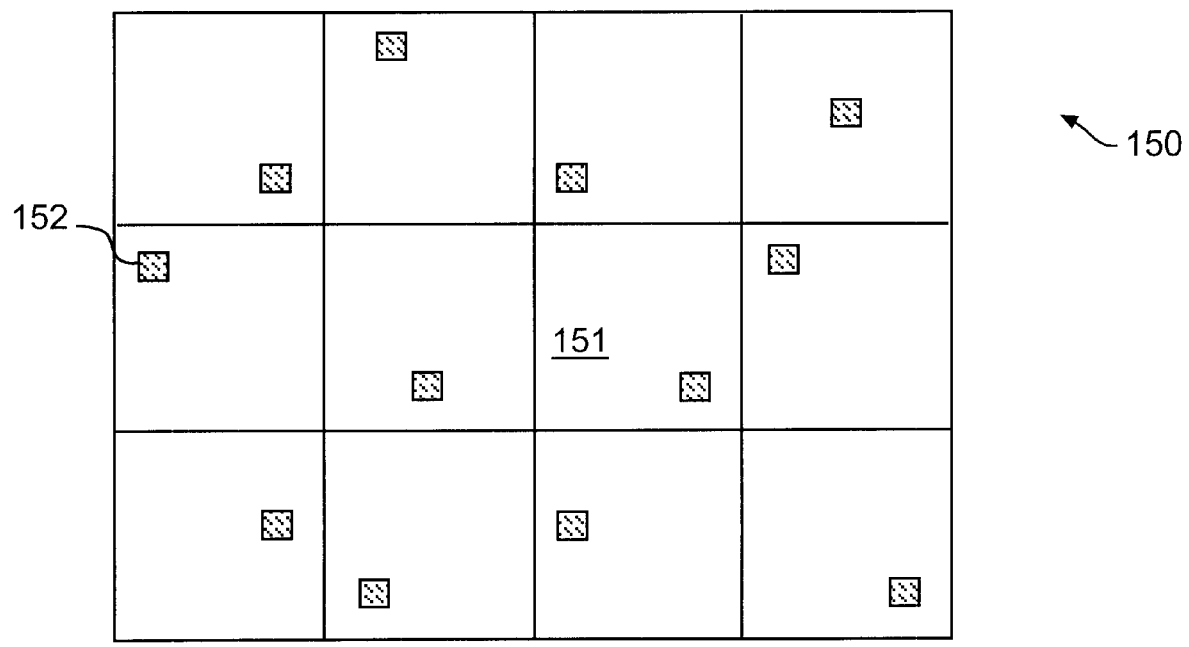
FIG. 6 is a schematic illustration of a tile that is partitioned into non-overlapping cells.

In the embodiment described below, a tile is a region of T×T elements (with T=200) in which one patch is applied for each bit of the watermark. Each patch is applied at a location within the tile that is selected randomly. Preferably, the locations are selected such that no patch overlaps another patch. One way in which this may be carried out is illustrated in FIG. 6, which is a schematic illustration of tile 150 partitioned into non-overlapping cells, of which cell 151 is an example. In the embodiment discussed below, each cell is an array of C×C elements, with C=12. No more than one patch is placed within a cell. Patch 152 is an example. The location of each patch within a respective cell is selected randomly and patches are prevented from overlapping one another by forcing each patch to lie completely inside its respective cell.

Figure 7:
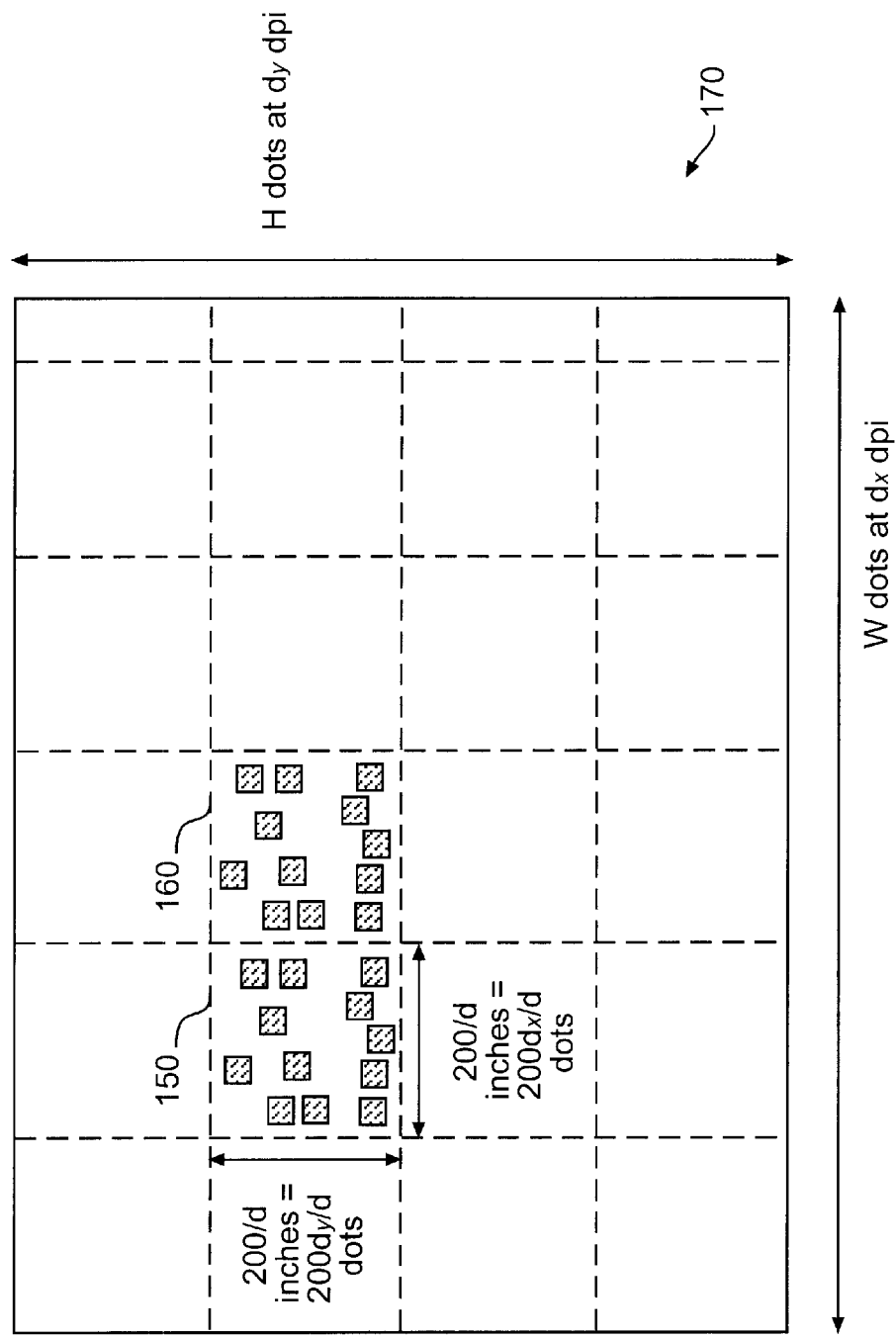
FIG. 7 is a schematic illustration of a printed image in which a grid of tiles is defined and placed relative to the image.

FIG. 7 is a schematic illustration of printed image 170 having a width W dots and a height H dots in which a grid of tiles is defined. Two adjacent tiles 150 and 160 are shown in the grid.

Referring again to FIG. 5, step 144 modifies the digital signal representing the image to be printed by modifying dots of the digital signal so that, at the selected patch locations, the dots either have a highly positive or a highly negative correlation with the corresponding selected patch. A highly positive correlation is forced in order to embed a watermark bit of value 1, and a highly negative correlation is forced in order to embed a watermark bit of value 0. The dot values that result from the modifications should be limited to the dynamic range of the dots (0–1, typically).

b. Program Fragment

An embodiment of method 140 is shown in the following program fragment. This program fragment is expressed in pseudo-code using a syntax that includes some syntactical features of the C program language. This program fragment and other program fragments are not intended to be source code segments suitable for compilation but are provided to convey a few aspects of possible implementations.

```
WriteWatermark (I, K, pid) {
    InitRNG (K);              //initialize random number generator
    WM = Concat (mst, pid);   //concatenate magic string and printer id
    WM = ErrCode (WM);        //append error correction code
    L = Len (WM);             //get length of the watermark
    (x, y) = (0,0)            //start of the first cell
    for i = 1 to L {          //determine patch for each bit of watermark
        P(i) = RNG (0, N-1);  //select patch out of N possibilities
        //obtain random location for B x B patch within C x C cell
        (x(i), y(i)) = (x,y) + (RNG (0, C-B), RNG (0, C-B));
        (x, y) = NextCell (x, y);   //get offset for next cell in the tile
    }
    for each image location (x, y) = ((x(i)+Tm)d_x/d, (y(i)+Tn)d_y/d)
        // (x, y) marks the beginning of a patch where the bit WM(i)
        // needs to be embedded; m,n are integers
        ApplyPatch (I, x, y, P(i), WM(i))
    }
}
```

The routine WriteWatermark receives the printer identifier pid to be embedded into the digital signal I.

The random number generator function RNG is initialized from the seed K, which may be a constant if desired. The watermark WM is obtained by first invoking a routine Concat to concatenate the printer identifer pid to magic string mst, and then by invoking a routine ErrCode to append an error-detection-correction (EDC) code. Essentially any form of EDC code may be used such as, for example, a Reed-Solomon code or a code for BCH coding. The magic string mst is used to improve the efficiency and reliability of reading the watermark and is discussed below.

The length of the watermark WM is obtained from function Len and is assigned to the variable L. In the embodiment described here, the length of the watermark is 255 bits.

The immediately following "for" loop determines and stores the patches comprising a prototypical tile by starting with the first cell at coordinates (x=0, y=0), invoking the function random number generator to randomly select a patch from a set of N zero-mean patches, and then randomly selecting a location (x(i), y(i)) within the cell. A random offset within the cell is obtained by using the function RNG to generate two values within the range from 0 to a value equal to the difference between the cell size and the patch size. This range of values ensures the selected patch lies completely inside the cell. In this embodiment, that value is (12−4)=8.

The function NextCell is then called to obtain the coordinates (x, y) of the next cell in the prototypical tile and the for loop then reiterates the process just described until all bits in the watermark WM have been processed. Preferably, some form of indexing is used to control the reiteration of this process for subsequent cells. The function NextCell is shown here as a convenience to simplify the program fragment and the accompanying discussion.

The "for" loop that immediately follows the generation of the patch kinds and locations is the main loop of the watermark embedding process. The condition $(x, y)=((x(i)+Tm)d_x/d, (y(i)+Tn)d_y/d)$ is satisfied only by image coordinates (x, y) that mark the beginning of a patch. Here m is an integer that runs in the range 0 through $(Wd/d_x)/T$ and n is an integer that runs in the range 0 through $(Hd/d_y)/T$. In any embodiment, the processing in this loop can be organized to best suit the data flow architecture of the printing pipeline shown in FIG. 4B. If, for example, the basic transfer unit of the pipeline is a row of dots, then it is most efficient to pre-sort the patch locations (x(i), y(i)) in raster order and use an internal buffer of $Bd_y/d$ rows. This buffer size would make sure that all dots belonging to patches ending on the most recent row are present inside the buffer and the raster-order sorted patch locations would allow these patches to be located efficiently.

The heart of the watermark embedding is the function denoted in the code by ApplyPatch (I, x, y, P(i), WM(i)). This function modifies the dots in the image area of width $Bd_x/d$ and height $Bd_y/d$ located at dot location (x, y) to make sure that its correlation with patch P(i) is either highly positive (when WM(i) equals 1) or highly negative (when WM(i) equals 0).

In color printing systems that represent colors with cyan (C), magenta (M), yellow (M) and possibly black (K) colorants, it is often advantageous to apply watermarks only to elements of digital signal I that represent Y and possibly K components of the image. This ensures that the visual impact of the modifications is minimal. Watermark detection can subsequently be done by measuring correlations on just the yellow color plane of CMY scanned data (i.e., the complement of RGB data with no black removal). Black needs to be modified because it will contribute to scanned yellow intensities. The ApplyPatch function is described using this as the preferred embodiment. Depending upon the patch kind and the bit to be embedded, each dot in the image area is classified as either belonging to the positive area or to the negative area. The object of ApplyPatch is to ensure that the number of 1-valued dots in the positive area exceeds the number of 1-valued dots in the negative area. Let #Y, #K denote the total number of 1-valued dots in the area, and let ΔY and ΔK denote the difference between the number of 1-valued dots in the positive and negative areas, for Y and K respectively.

ApplyPatch modifies the dots in a manner determined by #Y, #K, ΔY, and ΔK. If ΔY and ΔK are sufficiently positive, then no modifications are needed. Otherwise, based on the total number of Y and K dots in the patch area, and on the already existing correlations, a number of K dots is determined and these dots are then moved from the negative area to the positive area. This transfer tries to make ΔK at least zero. Then, based on #Y, ΔY, and the new values of #K, ΔK, a number of Y dots is determined and these dots are then moved from the negative area to the positive area. This transfer tries to make ΔY greater than a positive threshold which itself is determined by #Y, #K, ΔY, ΔK. If dot transfer alone cannot increase ΔY above the threshold, then some new yellow dots may be introduced in the positive area or some dots may be removed from the negative area. Each dot removal/addition may additionally be constrained so as to minimize distortions on salient image features such as edges. Further, locations near the boundary between negative and positive areas may be preferred for dot removal while locations close to the center of the negative area may be preferred for dot addition. The thresholds and other parameters used in ApplyPatch may be determined experimentally to be the ones that work the best without sacrificing image quality. The above description is meant to be taken as an example implementation of ApplyPatch; alternate implementations are possible with the same end result of forcing a correlation.

Figure 2A:
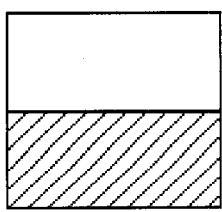
FIGS. 2A through 2D are schematic representations of four zero-mean patches.
Figure 2B:
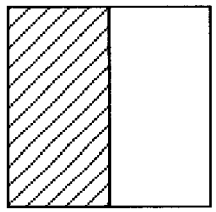
Figure 2C:
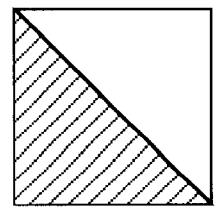
Figure 2D:
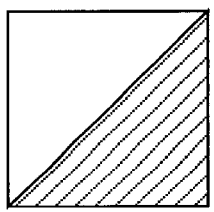

FIGS. 8 and 9 illustrate the processing done by ApplyPatch when the patch kind P(i) is the patch shown in FIG. 2B and the bit to be embedded WM(i) is 1. In this case, the left half of the patch is the positive area and the right half is the negative area.

Figure 8A:
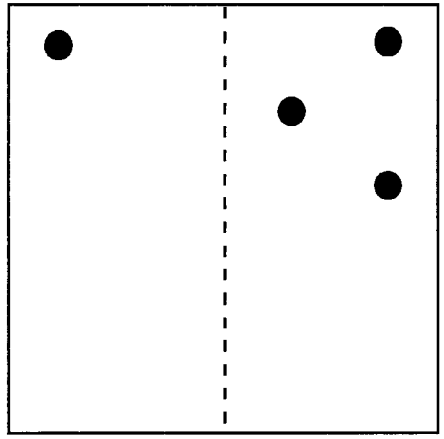
FIG. 8A is a schematic illustration of a region in the black component of an image that is to receive a patch.
Figure 8B:
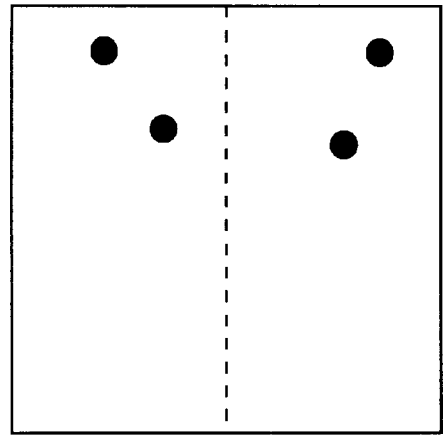
FIG. 8B is a schematic illustration of the region shown in FIG. 8A after the patch has been applied.

FIG. 8A is a schematic illustration of the black component of the image dots to be modified. According to a preferred embodiment of a color printing system, the black dots are modified with the end result shown in FIG. 8B which has an equal number of black dots in the positive and negative areas (ΔK=0).

Figure 9A:
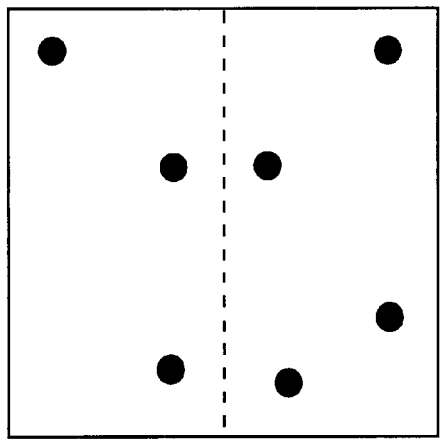
FIG. 9A is a schematic illustration of a region in the yellow component of an image that is to receive a patch.
Figure 9B:
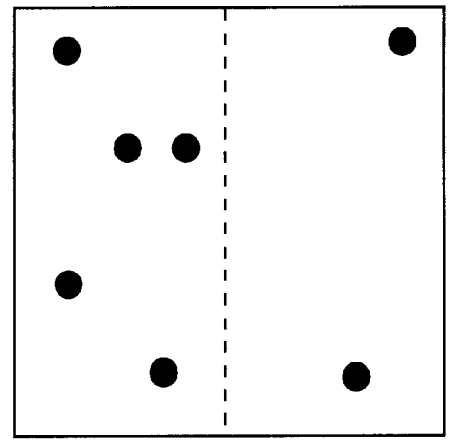
FIG. 9B is a schematic illustration of the region shown in FIG. 9A after the patch has been applied.

FIG. 9A is a schematic illustration of the yellow component of the image dots to be modified. According to a preferred embodiment of a color printing system, the yellow dots are modified with the end result shown in FIG. 9B which has a greater number of yellow dots in the positive area than in the negative area (ΔY=3).

2. Reading a Watermark a. General Description

Figure 10:
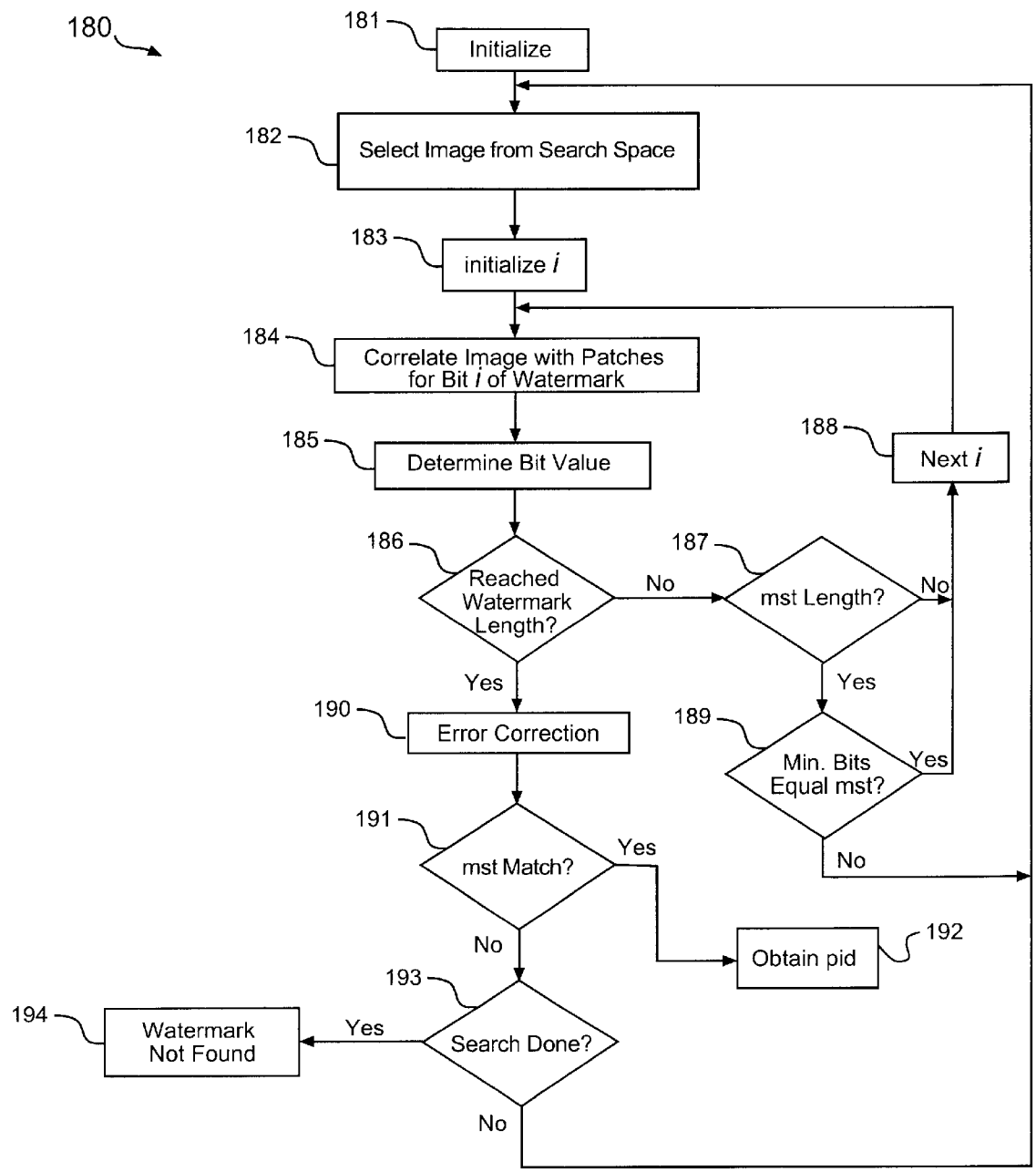
FIG. 10 illustrates steps in a method for reading a printer tracking watermark in a digital signal that is obtained by scanning the printed image.

The diagram in FIG. 10 illustrates steps in a method 180 for reading a printer tracking watermark in a digital signal J that is obtained from a printed image by scanning the printed image using a scanning resolution equal to the assumed resolution d mentioned above and then retaining only the color plane to be examined for the presence of a watermark (yellow of CMY in a preferred embodiment). Step 181 performs initialization for the remaining steps.

Step 182 selects an image from a search space which is to be examined to determine if a watermark is present. In a preferred embodiment, the search space includes variations for rotation and offset. The total image search space may be denoted $F_R \times F_O$. The magic string is used to identify the situation when the rotation and offset have aligned the image correctly to obtain pid recovery, as described below.

The notation $F_R=\{f_R\}$ represents the set of image rotations to be examined. Each element $f_R$ of the set corresponds to a particular rotation of the image represented by digital signal J. Smaller angles are tried first. Rotations may be carried out in a number of ways including nearest-neighbor resampling of pixels (signal elements) and the three-shear rotation method.

The notation $F_O=\{f_O\}$ represents the set of image offset or translation operations to be examined. Each element $f_O$ of the set corresponds to a particular offset of the image represented by digital signal J. This set includes offsets in both the horizontal and vertical directions that are limited to ±T/2 pixels. This range is sufficient as the tiles of a watermark (if one is present) are bound to align themselves perfectly with the offset at least once in this range. The offsets search space may be spanned first using coarse increments on the order of B/2, where B is the size of the zero-mean patches, and then using increments of one pixel may be used to refine the search around the highest number of matches with the magic string. Note that since the image is scanned at d dpi, pixel elements in the scanned image have the same resolution as that of the watermark used in WriteWatermark, and hence no scaling is necessary.

Step 183 performs initialization activities, which includes the initialization of a random number generator, the selection of patch kind and patch locations exactly as in WriteWatermark, and a variable i to reference the first bit in the watermark binary string WM(i). Step 184 correlates the selected image with the appropriate patch for bit i of the watermark over a plurality of tile locations. Step 185 counts the number of tiles in which the correlation score indicates a "1" bit was encoded, counts the number of tiles in which the correlation score indicates a "0" bit was encoded, and determines whether the correlation process detected a "1" bit or a "0" bit.

Step 186 determines whether the bit i is the last bit of the watermark to be read. If not, step 187 determines whether bit i is the last bit of the magic string mst. If bit i is not the last bit of the magic string, step 188 increments i to the next bit of the watermark and the method continues with step 184, which reiterates the correlation and bit-reading process for the next bit i. If step 187 determines that bit i is the last bit of the magic string mst, step 189 determines whether a sufficient number of the bits read from the image equal the corresponding bits of the magic string. Exact equality with the magic string is not expected because the embedded watermark is vulnerable to a number of error-causing phenomena and an error correction process has not yet been applied to the string of bits read from the image.

With respect to practical embodiments, it is probably more efficient to perform the test in step 187 before performing the test in step 186. The order of the steps discussed above is chosen merely for the sake of convenience in illustrating the method in FIG. 10. This example reinforces what was mentioned above. The program fragments and the descriptions of methods disclosed herein are not intended to represent optimized examples suitable for immediate practical application. Rather, they are set forth as simplified examples to help explain concepts.

If step 189 determines that an insufficient number of bits equal corresponding bits in the magic string, the method continues with step 182, which selects the next image from the search space. If a sufficient number of the bits read thus far do equal the corresponding bits in the magic string, the method continues with step 188, which causes the correlation and bit-reading process to continue with the next bit of the watermark.

When step 186 determines that the last bit i of the watermark has been read, step 190 performs an error correction process on the string of bits. Step 191 determines whether a portion of error-corrected bit string equals the magic string mst. If there is a match, the printer identifier pid portion of the watermark is extracted. If there is no exact match with the magic string, step 193 determines whether any other images are to be selected from the search space. If so, step 182 continues the method with the next selected image. If not, the method terminates with an indication that the watermark was not found.

b. Program Fragment

An embodiment of this method is shown in the following program fragment.

```
ReadWatermark (J, K) {
    ML = len (mst);              //initialize mst length value
    InitRNG (K);                 //initialize random number generator
    (x, y) = (0,0)               //start of the first cell
    for i = 1 to L {             //determine patch for each bit of watermark
        P(i) = RNG (0, N-1);     //select patch out of N possibilities
        //obtain random location for B x B patch within C x C cell
        (x(i), y(i)) = (x,y) + (RNG (0, C-B), RNG (0, C-B));
        (x, y) = NextCell (x, y);    //get offset for next cell in the tile
    }
    for each (f_R f_O) in F_R x F_O {
        Jm = SearchSpace (J, (f_R f_O))    //get image from search space
        for i = 1 to L {                    //for each bit of the watermark
            OneCount = 0;                   //initialize counters
            ZeroCount = 0;
            for each tile location (mT, nT) in image Jm {
                C = CorrelatePatch (Jm, P(i), mT+x(i), nT+y(i));
                if (C ≥ Cmin) then OneCount = OneCount + 1;
                else if (C ≤ -Cmin) then ZeroCount = ZeroCount + 1;
            }
            if (OneCount > ZeroCount) then WM(i) = 1;
            else WM (i) = 0;
            if ( i = ML) then            //if we are at end of mst
                if (MatchMST (WM) < MTH) then
                    exit loop;           //go to next image in search space
        }
        WM = ErrorCorrect (WM);      //apply error correction
        if (MatchMST (WM) = ML) then {           //if mst was found
            pid = ExtractPID (WM);   //extract the pid
            return pid;              //return the extracted pid
        }
    }
    return Failed;               //watermark not found
}
```

In this program fragment, function ReadWatermark either returns the printer identifier pid read from the image digital signal J or it returns an indication that the watermark was not found.

An attempt is made to read a watermark from each image selected from the search space. This attempt is made by initializing the random number generator RNG for each selected image Jm, obtaining the patch locations and kinds, and then looking for each bit of the watermark, one at at time, in each tile location within the selected image Jm.

For each bit of the watermark, counters for zero and one bits are initialized to zero, the appropriate patch is selected, and the cell location within a tile for this patch is determined. Using this selected patch and cell offset, each tile location within the selected image is examined by calculating a correlation score. If the correlation score is greater than or equal to a threshold Cmin, a counter for the number of one bits is incremented. If the correlation score is less than or equal to the negative of this threshold, a counter for the number of zero bits is incremented. A typical value for this threshold is about one-half the number of elements in each patch, which is 8 in this embodiment.

After the cell location in all tile locations has been examined, the counters for the one and the zero bits are compared. If the counter for the one bits is greater than the counter for the zero bits, the corresponding bit of the watermark read from the selected image is deemed to be a one; otherwise, it is deemed to be a zero.

When the number of bits read from the selected image is equal to the length of the magic string mst, the routine MatchMST is invoked to determine how many of the bits read from the selected image equal the corresponding bits in the magic string. If the number is less than some threshold amount MTH, the currently selected image Jm is not examined further. Processing continues by exiting the loop and selecting another image from the search space.

If the number of bits that match are greater than or equal to the threshold, examination of the currently selected image continues until an attempt has been made to read all bits of the watermark. When this is accomplished, routine Error-Correct is invoked to perform error correction on the watermark WM. Following error correction, the portion of the watermark that corresponds to the magic string is compared to the magic string mst. If the two are equal, function ExtractPID is invoked to extract the printer identifier pid from the watermark. If the two are not equal, processing continues by selecting another image from the search space. This continues until either a valid watermark is found or no further images remain to select from the search space.

C. Implementation

Figure 11:
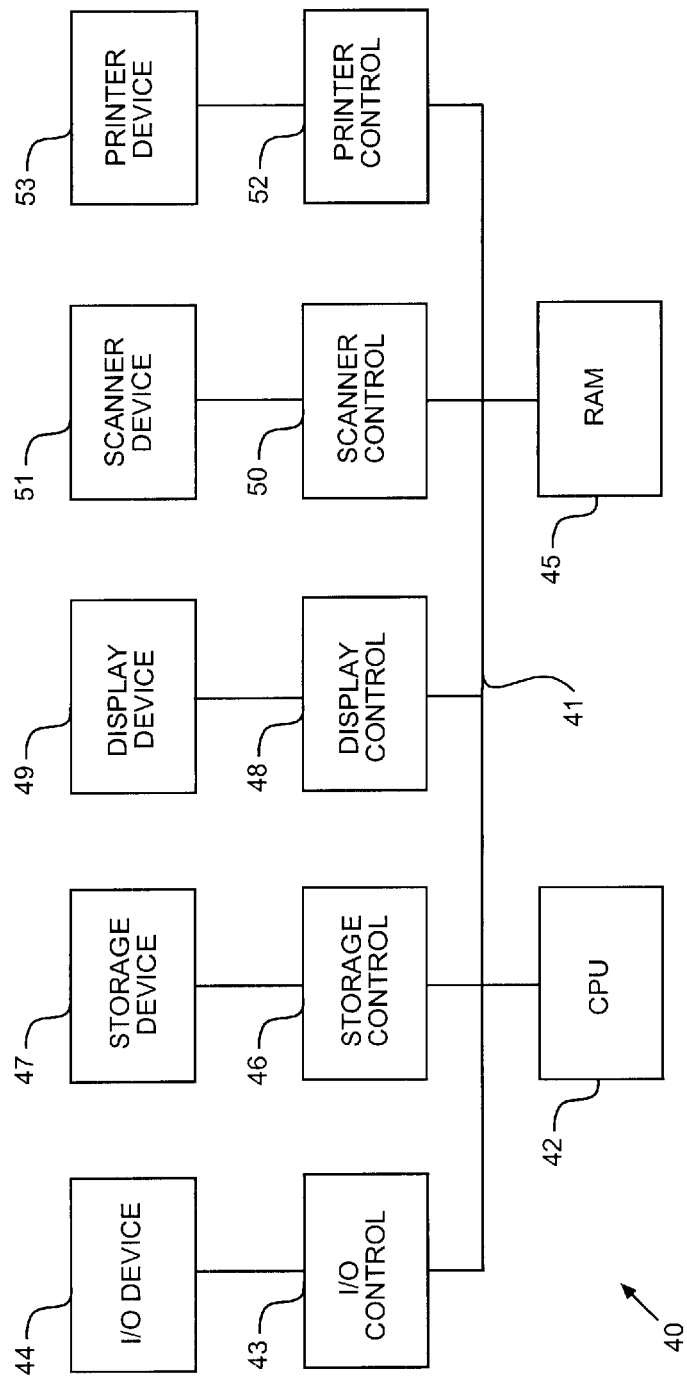
FIG. 11 is a functional block diagram of a typical computer system that may be used to implement various aspects of the present invention.

The present invention may be implemented in a wide variety of ways including software in a typical computer system. FIG. 11 is a functional block diagram of a typical computer system 40 that may be used to implement various aspects of the present invention. CPU 42 provides computing resources. I/O control 43 represents an interface to I/O device 44 such as a keyboard or mouse. RAM 45 is system random access memory (RAM). Storage control 46 represents an interface to storage device 47 that includes a storage medium such as magnetic tape or disk, or an optical medium. The storage medium may be used to record programs of instructions for operating systems, utilities and applications, and may include embodiments of programs that implement various aspects of the present invention. Display control 48 provides an interface to display device 49. Scanner control 50 represents an interface to scanner device 51 that is an input device like an optical scanner. Printer control 52 represents an interface to printer device 53 that is an output device like an ink jet printer.

In the embodiment shown, all major system components connect to bus 41 which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. Preferably, display control 48 connects to a high-bandwidth bus to improve the speed of display. A bus architecture is not required to practice the present invention.

The functions required to practice various aspects of the present invention can be performed by components that are implemented in a wide variety of ways including discrete logic components, one or more ASICs and/or program-controlled processors. The manner in which these components are implemented is not important to the present invention. For example, the operations required to practice the present invention can be implemented in a computer system such as computer system 40 by programs of instructions that are stored in storage device 47, copied into RAM 45 and executed by CPU 42. Various aspects of the present invention, such as applying the watermark, can be conveniently implemented in a type of program known as a device driver.

Such software may be conveyed by a variety machine readable medium including magnetic tape, magnetic disk, optical disc, and baseband or modulated communication paths throughout the spectrum including from supersonic to ultraviolet frequencies. Various aspects can also be implemented in various components of computer system 40 by processing circuitry such as ASICs, general-purpose integrated circuits, microprocessors controlled by programs embodied in various forms of read-only memory (ROM) or RAM, and other techniques.

While the invention has been described in conjunction with several specific embodiments, many further alternatives, modifications and variations will be evident to those skilled in the art in light of the foregoing description. Thus, the invention described herein is intended to embrace all such alternatives, modifications, applications and variations as may fall within the spirit and scope of the appended claims.

What is claimed is:

1. A method for applying a source-identifying watermark to a digital signal, comprising the steps of:
    obtaining a source identifier;
    constructing a multi-bit string representing the watermark to be embedded, the multi-bit string including the source identifier;
    randomly selecting a sequence of zero-mean patches representing the watermark to be embedded, each patch comprising an array of patch elements; and
    applying each zero-mean patch of the sequence to a randomly selected location of the digital signal so that, at the selected patch location, the digital signal has either a highly positive or highly negative correlation with the correspondingly selected patch.

2. The method of claim 1, wherein the randomly selected sequence of zero-mean patches includes one patch for each bit of the watermark to be embedded.

3. The method of claim 1, further comprising the step of:
    randomly selecting a location with a selected tile of the digital signal for each zero-mean patch of the sequence and obtaining respective offsets within the selected tile for each of the zero-mean patches; and
    wherein the zero-mean patch applying step applies each zero-mean patch of the sequence to the randomly selected location within the selected tile of the digital signal.

4. The method of claim 3, wherein the digital signal comprises a plurality of additional tiles and wherein the zero-mean patch applying step applies each zero-mean patch of the sequence to a randomly selected location within each of the additional tiles.

5. The method of claim 4, wherein each tile is partitioned into a plurality of non-overlapping cells and wherein no more than one zero-mean patch is applied within any given cell.

6. The method of claim 3, wherein the selected tile is partitioned into a plurality of non-overlapping cells and wherein no more than one zero-mean patch is applied within any given cell.

7. The method of claim 1, wherein the zero-mean patch applying step comprises modifying dots of the digital signal so that, at the selected patch location, the dots have either a highly positive or a highly negative correlation with the correspondingly selected patch.

8. The method of claim 7, wherein a highly positive correlation is obtained to embed a watermark bit of value 1 and a highly negative correlation is obtained to embed a watermark bit of value 0.

9. The method of claim 1, wherein the multi-bit string further includes a synchronization string and an error-detection-correction code.

10. The method of claim 1, wherein each patch in the randomly selected sequence of zero-mean patches is a square array of elements selected from a fixed set of a predetermined number of zero-mean patches.

11. The method of claim 1, wherein the source-identifying watermark is applied by a printer as the digital signal is processed for generating a printed image and wherein the source-identifying watermark identifies the printer from which the printed image was printed.

12. A method for reading a watermark from a cover object, comprising the steps of:
    obtaining a first digital signal from the cover object;
    selecting a portion of the first digital signal which is to be examined to determine if the watermark is present in the cover object;
    obtaining a multi-bit string representing the watermark to be read;
    obtaining zero-mean patch kinds that were previously applied to a second digital signal of the cover object and the corresponding locations where the patches were applied in the second digital signal;

correlating the first digital signal with a zero-mean patch kind for a corresponding bit of the watermark over a plurality of tiles in the first digital signal to obtain a sequence of bits; and comparing the sequence of bits obtained in the correlating step with corresponding bits of the multi-bit string to determine whether the watermark has been detected in the cover object.

13. The method of claim 12, wherein the first digital signal is obtained from a printed rendition of the cover object by scanning the printed rendition at a resolution substantially equal to a resolution at which the watermark was embedded.

14. The method of claim 12, wherein the printed rendition is a color rendition and wherein the first digital signal obtained represents one of a plurality of color planes.

15. The method of claim 12, wherein the portion of the first digital signal selected to be examined is selected from a search space that includes variations for rotation and offset.

16. The method of claim 12, wherein, for each watermark bit, the digital signal at a location of the corresponding patch within each tile is correlated with the corresponding zero-mean patch kind to obtain the sequence of bits.

17. The method of claim 16, wherein a correlation score is determined for each watermark bit with respect to each tile by correlating the digital signal at the corresponding patch location in that tile with the corresponding zero-mean patch kind.

18. The method of claim 17, wherein the number of tiles in which the correlation score indicates a bit of value 1 was encoded are counted and the number of tiles in which the correlation score indicates a bit of value 0 was encoded are counted to determine whether the correlating step detected a 1 bit or a 0 bit.

19. An apparatus for applying a source-identifying watermark to a digital signal, comprising:

means for obtaining a source identifier;

means for constructing a multi-bit string representing the watermark to be embedded, the multi-bit string including the source identifier;

means for randomly selecting a sequence of zero-mean patches representing the watermark to be embedded, each patch comprising an array of patch elements; and means for applying each zero-mean patch of the sequence to a randomly selected location within the digital signal so that, at the selected patch location, the digital signal has either a highly positive or highly negative correlation with the correspondingly selected patch.

20. A medium readable by a device embodying a program of instructions for execution by said device to perform a method for applying a source-identifying watermark to a digital signal, the method comprising the steps of:

obtaining a source identifier;

constructing a multi-bit string representing the watermark to be embedded, the multi-bit string including the source identifier;

randomly selecting a sequence of zero-mean patches representing the watermark to be embedded, each patch comprising an array of patch elements; and applying each zero-mean patch of the sequence to a randomly selected location of the digital signal so that, at the selected patch location, the digital signal has either a highly positive or highly negative correlation with the correspondingly selected patch.

21. The medium of claim 20, wherein the randomly selected sequence of zero-mean patches includes one patch for each bit of the watermark to be embedded.

22. The medium of claim 20, wherein the method further comprises the step of:

randomly selecting a location with a selected tile of the digital signal for each zero-mean patch of the sequence and obtaining respective offsets within the selected tile for each of the zero-mean patches; and wherein the zero-mean patch applying step applies each zero-mean patch of the sequence to the randomly selected location within the selected tile of the digital signal.

23. The medium of claim 22, wherein the digital signal comprises a plurality of additional tiles and wherein the zero-mean patch applying step applies each zero-mean patch of the sequence to a randomly selected location within each of the additional tiles.

24. The medium of claim 23, wherein each tile is partitioned into a plurality of non-overlapping cells and wherein no more than one zero-mean patch is applied within any given cell.

25. The medium of claim 22, wherein the selected tile is partitioned into a plurality of non-overlapping cells and wherein no more than one zero-mean patch is applied within any given cell.

26. The medium of claim 20, wherein the zero-mean patch applying step comprises modifying dots of the digital signal so that, at the selected patch location, the dots have either a highly positive or a highly negative correlation with the correspondingly selected patch.

27. The medium of claim 26, wherein a highly positive correlation is obtained to embed a watermark bit of value 1 and a highly negative correlation is obtained to embed a watermark bit of value 0.

28. The medium of claim 20, wherein the multi-bit string further includes a synchronization string and an error-detection-correction code.

29. The medium of claim 20, wherein each patch in the randomly selected sequence of zero-mean patches is a square array of elements selected from a fixed set of a predetermined number of zero-mean patches.

30. The medium of claim 20, wherein the source-identifying watermark is applied by a printer as the digital signal is processed for generating a printed image and wherein the source-identifying watermark identifies the printer from which the printed image was printed.

31. An apparatus for reading a watermark from a cover object, comprising:

means for obtaining a first digital signal from the cover object;

means for selecting a portion of the first digital signal from a search space which is to be examined to determine if the watermark is present in the cover object;

means for obtaining a multi-bit string representing the watermark to be read;

means for obtaining zero-mean patch kinds that were previously applied to a second digital signal of the cover object and the corresponding locations where the patches were applied in the second digital signal;

means for correlating the first digital signal with a zero-mean patch kind for a corresponding bit of the watermark over a plurality of tiles in the first digital signal to obtain a sequence of bits; and means for comparing the sequence of bits obtained in the correlating step with corresponding bits of the multi-bit string to determine whether the watermark has been detected in the cover object.

32. A medium readable by a device embodying a program of instructions for execution by said device to perform a method for reading a watermark from a cover object, the method comprising the steps of:

obtaining a first digital signal from the cover object;

selecting a portion of the first digital signal which is to be examined to determine if the watermark is present in the cover object;

obtaining a multi-bit string representing the watermark to be read;

obtaining zero-mean patch kinds that were previously applied to a second digital signal of the cover object and the corresponding locations where the patches were applied in the second digital signal;

correlating the first digital signal with a zero-mean patch kind for a corresponding bit of the watermark over a plurality of tiles in the first digital signal to obtain a sequence of bits; and comparing the sequence of bits obtained in the correlating step with corresponding bits of the multi-bit string to determine whether the watermark has been detected.

33. The medium of claim 32, wherein the first digital signal is obtained from a printed rendition of the cover object by scanning the printed rendition at a resolution substantially equal to a resolution at which the watermark was embedded.

34. The medium of claim 32, wherein the printed rendition is a color rendition and wherein the first digital signal obtained represents one of a plurality of color planes.

35. The medium of claim 32, wherein the portion of the first digital signal selected to be examined is selected from a search space that includes variations for rotation and offset.

36. The medium of claim 32, wherein, for each watermark bit, the digital signal at a location of the corresponding patch within each tile is correlated with the corresponding zero-mean patch kind to obtain the sequence of bits.

37. The medium of claim 36, wherein a correlation score is determined for each watermark bit with respect to each tile by correlating the digital signal at the corresponding patch location in that tile with the corresponding zero-mean patch kind.

38. The medium of claim 37, wherein the number of tiles in which the correlation score indicates a bit of value 1 was encoded are counted and the number of tiles in which the correlation score indicates a bit of value 0 was encoded are counted to determine whether the correlating step detected a 1 bit or a 0 bit.

* * * * *